United States Patent [19] [11] 4,097,667
Holst et al. [45] Jun. 27, 1978

[54] HYDROXYALKYL CELLULOSE ETHERS

[75] Inventors: Arno Holst; Michael Kostrzewa, both of Wiesbaden, Germany

[73] Assignee: Hoechst Aktiengesellschaft, Frankfurt am Main, Germany

[21] Appl. No.: 751,457

[22] Filed: Dec. 16, 1976

[30] Foreign Application Priority Data

Dec. 17, 1975 Germany ............................ 2556754

[51] Int. Cl.² ...................... C08B 11/08; C08B 11/20
[52] U.S. Cl. ...................................... 536/87; 106/170; 536/66; 536/67; 536/91; 536/95; 536/96
[58] Field of Search .................... 536/87, 66, 67, 91, 536/95, 96; 106/170

[56] References Cited

U.S. PATENT DOCUMENTS

| | | | |
|---|---|---|---|
| 2,330,263 | 9/1943 | Broderick | 536/66 |
| 2,602,789 | 7/1952 | Schwartz et al. | 536/66 |
| 3,072,635 | 1/1963 | Menkart et al. | 536/87 |
| 3,287,353 | 11/1966 | Stidham | 536/96 |
| 3,527,751 | 9/1970 | Gill | 536/89 |
| 3,705,890 | 12/1972 | Barker et al. | 536/67 |

FOREIGN PATENT DOCUMENTS 1,289,549  9/1972  United Kingdom ................... 536/67

Primary Examiner—Ronald W. Griffin
Attorney, Agent, or Firm—Richard L. Schwaab

[57] ABSTRACT

Disclosed is a process for the chemical modification of a water-soluble cellulose ether, which comprises reacting the ether with a chloroformic acid ester in an aqueous organic medium containing alkali hydroxide, whereby the cellulose ether is rendered at least partially insoluble in water. The modified cellulose ether may be easily dispersed in water and redissolved to form a smooth solution of the original water-soluble ether by adding sufficient alkali to the dispersion to reuse its pH to at least about 11, preferably to about 12.

12 Claims, No Drawings

HYDROXYALKYL CELLULOSE ETHERS

BACKGROUND OF THE INVENTION (a). Field of the Invention

This invention relates to a process for modifying water-soluble hydroxyalkyl cellulose ethers in order to render them completely or partially water-insoluble. The invention also provides a process whereby the modified cellulose ethers may be returned to the water-soluble state.

(b). Prior Art

Water-soluble cellulose ethers may be treated with cross-linking agents, especially by relatively light cross-linking with glyoxal, to the extent that they are rendered temporarily completely or partially insoluble in water. Cellulose ethers rendered water-insoluble in this manner may be poured and stirred into water without too much danger of lump formation, as happens when using cellulose ethers which have not been made water-insoluble. When mixed with water, the water-insoluble cellulose ethers return to the water-soluble state over a period of some minutes to hours, i.e., a more or less high viscosity aqueous solution of cellulose ether is ultimately obtained. It is possible to accelerate, to a higher or lower degree, the reconversion into the water-soluble state by alkalizing, to a greater or lesser extent, the water into which the water-insoluble cellulose ether is stirred. Accelerated reconversion into the water-soluble state occasionally occurs unintentionally and is sometimes not desired, ffor example, when stirring substances that give an alkaline reaction into an aqueous suspension of a water-insoluble cellulose ether, such as when stirring in pigments which give an alkaline reaction in the production of dispersion paints.

It would be desirable to provide hydroxyalkyl-celluloses which are not only completely or partially insoluble in water but which also remain insoluble in water and slightly alkaline aqueous media for a very long time.

It has previously been proposed, in German Offenlegungsschriften No. 2,062,245 and No. 2,062,246, to produce cellulose carbonates which are especially suitable to serve as a matrix for the chemical coupling of enzymes in order to produce water-insoluble enzyme preparations in a form in which they can be used repeatedly and are less sensitive to heat. The process involves the reaction of cellulose with a chloroformic acid ester in an organic solvent in the presence of a base, but with the exclusion from the reaction mixture active hydrogen atoms, e.g., from free hydroxyl, mercapto, imido and amido groups. Dimethyl sulphoxide, dioxane or dimethylformamide are suggested as organic solvents, and tertiary amines, such as triethylamine, are suggested as bases. The organic solvents and the bases are preferably used in a completely dry, i.e., absolutely anhydrous, state. A large excess of chloroformic acid ester, approximately 30 mole to 1 mole of cellulose (anhydroglucose), is used, and the reaction takes place to a considerable extent only when large quantities of organic base are used, approximately 9 mole to 1 mole of cellulose. It is stated to be possible to use substituted cellulose, for example, hydroxyethyl cellulose, in the reaction with chloroformic acid ester; hoever, only the reaction of diethylaminoethylcellulose with chloroformic acid ethyl ester in dry dimethyl sulphoxide in the presence of triethylamine has heretofore actually been described. Investigations have demonstrated, however, that water-soluble hydroxyethylcellulose is not suitable for the described process.

SUMMARY OF THE INVENTION

One object of the invention is to provide a process for the modification of a water-soluble hydroxyalkyl cellulose ether to obtain a product which is at least partially water-insoluble, but which is readily dispersible in water and which can be easily converted from the dispersed condition into a smooth, homogenous aqueous solution by the addition of sufficient alkali to reach a pH of at least about 11.

Another object is to provide a process for the modification of a water-soluble cellulose ether as stated above, whereby a modified product is obtained which remains substantially unchanged when dispersed in water, in dilute aqueous acids or in slightly alkaline aqueous solutions.

A further object is the provision of a modified product obtained according to the above process.

Another object resides in providing a process for the conversion of the modified product into a smooth, homogenous aqueous solution consisting substantially of the original water-soluble cellulose ether.

In accomplishing these objects according to the invention, a process is provided for the modification of a cellulose ether containing hydroxyalkyl groups, which process comprises the steps of reacting said ether with a chloroformic acid ester in an aqueous organic medium containing alkali hydroxide, whereby said cellulose ether is rendered at least partially insoluble in water.

The term "aqueous organic medium" as used in the specification and the claims means a solvent mixture of water and at least one organic solvent.

Other objects, features and advantages of the invention will appear from the following description of the invention and its preferred embodiments.

DETAILED DESCRIPTION OF PREFERRED EMBODIMENTS

By the process of the invention, a modified hydroxyalkyl cellulose ether is obtained which — depending on the quantity of chloroformic acid ester used — is partially or completely water-insoluble, but in an aqueous alkaline medium (pH e.g., approximately 12), is changed back into a water-soluble hydroxyalkyl cellulose ether.

It will be seen that, in the process according to the invention, the procedure is contrary to the instructions to be followed when carrying out the previously proposed process, in that compounds containing hydroxyl groups are present, as are water and alkali hydroxide. Preferably, isopropanol or tert.-butanol is used as the organic solvent. Methanol is, however, not very suitable. Depending on the content of hydroxyalkyl groups of the water-soluble hydroxyalkyl cellulose ether, more or less water may be present. The upper limit is based on the fact that the hydroxyalkyl cellulose ether may be permitted to absorb water from the mixture of water and organic solvent only to an extent which does not cause its own particles to stick together. Therefore the water content, calculated on the total water/solvent mixture, should normally not exceed about 40% by weight. On the other hand, there must be suffficient water present to enable the intended reaction to take place. If quantities of water are present which are small in relation to the alkali hydroxide, two liquid phases may result, but this does not interfere with the reaction. Preferably, the water content of the mixture should be at least 10 % by weight to ensure a smooth and easy reaction.

A further difference from the previously proposed process for the production of cellulose carbonates is that considerably smaller quantities of chloroformic acid ester are sufficient in the process according to the present invention. If a practically insoluble product is required, e.g. a quantity of approximately 0.15 mole of chloroformic methyl ester per mole of hydroxyalkyl cellulose ether may be quite adequate, e.g. in the case of a hydroxyethyl cellulose ether of one of the conventional degrees of substitution (39% by weight $OC_2H_4$).

In this specification there is always to be understood by the molar weight (1 mole) of the hydroxyalkyl cellulose ether that of an anhydroglucose unit which is substituted by the average quantity of hydroxyalkyl groups, i.e., the quantity corresponding to the degree of substitution.

There is no maximum limit to the quantity of chloroformic acid ester per se since, even in the case of greater quantities of chloroformic acid ester, water-insoluble products are obtained which return to the water-soluble state in an alkaline medium. However, it is generally advisable not to use more than about 6 moles of chloroformic acid ester per mole of the hydroxyalkyl cellulose ether, and a proportion of 0.1 to 0.6 mole per mole is preferred.

Sometimes it is unnecessary to modify the hydroxyalkyl cellulose ether to such an extent that it is completely free of water-soluble portions. If this is the case, less than 0.15 mole of chloroformic acid ester is required; however, the use of less than 0.025 mole is in most cases of no practical value. The modified products still containing more or less large quantities of water-soluble portions yield aqueous solutions of more or less high viscosity, in which the insoluble portions remain suspended for a long period in uniform distribution. These insoluble portions go into solution if the solution is rendered alkaline. Dissolution begins at pH values of about 11 to 11.5 and occurs at distinctly greater rates (e.g., within the course of one hour) at pH values of approximately 12.5 or higher.

The preferred chloroformic ester is the methyl ester. It is not only the most readily available but, for the purposes of the present invention, it is also more effective and reacts more rapidly than, for example, the benzyl ester, which, however, may also be used. After the methyl ester, the ethyl ester is the next most suitable. Generally, chloroformic esters of monohydric alcohols having from 1 to about 8 carbon atoms may be used.

The alkali hydroxide is preferably used in a quantity approximately equivalent to the quantity of chloroformic acid ester, i.e., in a relative molar ratio of about 1:0.9 to 1:1.1. The proportion of alkali hydroxide may be increased, however, up to about 10 moles per mole of chloroformic acid ester, if desired. Reaction of the hydroxyethylcellulose with the chloroformic acid ester under the preferred conditions takes place at about 20 to 40° C. in about 15 to 60 minutes.

The process according to the invention may, of course, also be applied to hydroxyalkyl cellulose ethers which contain methyl ether groups in addition to the hydroxyalkyl ether groups. Of course, the greater the total substitution of the cellulose by ether groups, the slower the reaction with the chloroformic acid ester.

The present invention also provides a process for the production of an aqueous solution of a hydroxyalkyl cellulose ether which has been modified by reaction with chloroformic acid ester in the presence of a base in which the modified hydroxyalkyl cellulose ether is dispersed in water, and the pH value of the dispersion is raised to at least about 11, preferably to approximately 12 or more. This is effected, for example, by adding an appropriate quantity of sodium hydroxide solution. Other agents suitable for this purpose are, inter alia, potassium hydroxide solution, alkali metasilicate, and quicklime.

The following examples illustrate the invention, without being in any way limiting. The hydroxyalkyl cellulose ether used in Examples 1 to 13 is a hydroxyethylcellulose (HEC) with 39.3% by weight of $OC_2H_4$ substituents. A 2% by weight solution in water of the HEC has a viscosity of 8,000 cp at 20° C., and its molecular weight is 267. In the following examples isopropyl alcohol means 100% strength isopropyl alcohol unless otherwise stated. The viscosity data refer to measurements with a Hoeppler viscosimeter at 20° C. with 2% by weight solutions, insoluble and therefore dispersed portions being included.

EXAMPLE 1

100 g of hydroxyethylcellulose (0.375 mole) are suspended in a mixture of 1,115 ml of isopropyl alcohol and 126 ml of water, containing 2.6 g of NaOH (0.065 mole) and the whole is stirred for 30 minutes at room temperature. A solution of 6 g of chloroformic acid methyl ester (0.063 mole) in 20 ml of isopropyl alcohol is then added dropwise and stirring is continued for 15 minutes. The mixture is then filtered through a glass suction filter and the residue is washed twice with approximately 60% by weight aqueous isopropyl alcohol. The water adhering to the residue is removed by rinsing with acetone and drying is effected at 60° C. The hydroxyethyl cellulose-carbonate obtained is sparingly soluble in water and in 0.1N hydrochloric acid. It cannot be dispersed in water permanently but its particles settle out very rapidly. If dilute sodium hydroxide solution (2N) is added to the aqueous dispersion, the HEC carbonate goes irreversibly into a clear solution. The HEC is not soluble in the usual organic solvents but is capable of swelling in some of them.

EXAMPLE 2

The procedure is as in Example 1 except that a solution of 10 g of chloroformic acid methyl ester (0.106 mole) in 20 ml of isopropanol is used and accordingly 4.25 g of NaOH (0.106 mole) is used to take up the hydrochloric acid produced during the reaction. A product is obtained which is sparingly soluble in water, settles very rapidly therein and has solubility behavior similar to that of the product obtained in Example 1.

EXAMPLE 3

The procedure is as in Example 1 except that a solution of 20 g of chloroformic acid methyl ester (0.21 mole) in 20 ml of isopropanol and, accordingly 8.5 g of NaOH (0.21 mole) are used. A product is obtained which is insoluble in water and rapidly settles therein and which has a solubility behavior similar to that of the products obtained according to Examples 1 and 2.

EXAMPLE 4

5 g of the hydroxyethyl cellulose (18.7 m mole) are suspended in a mixture of 225 ml of isopropyl alcohol and 25 ml of water, containing 150 mg of NaOH (3.75 m mole) and the procedure is then as in Example 1 using a solution of 200 mg of chloroformic acid mthyl ester (2.1 m mole) in 10 ml of isopropanol. A white product is obtained which dissolves only partially in water; a 2% by weight dispersion has a viscosity of 1,340 cp.

EXAMPLE 5

The procedure is as in Example 4 except that only 100 mg of chloroformic acid methyl ester (1.06 m mole) and, as before, 150 mg NaOH (3.75 m mole) are used. A product which is partially soluble in water is obtained. A 2% by weight dispersion has a viscosity of 1,950 cp.

EXAMPLE 6

The procedure is as in Example 4 except that 50 mg of chloroformic acid methyl ester (0.5 m mole) are used, again using 150 mg of NaOH (3.75 m mole). The product obtained, which is partially soluble in water, has a viscosity of 2,400 cp.

EXAMPLE 7

The procedure is as in Example 4 except that 2 g of chloroformic acid methyl ester (21 m mole) and, correspondingly, 880 mg of NaOH (22 m mole) are used. A product is obtained which is insoluble in and settles out in water and which has solubility properties analogous to those of the products obtained in Examples 1 to 3.

EXAMPLE 8

The procedure is as in Example 4 except that 8.8 g of chloroformic acid methyl ester (93.5 m mole) and, correspondingly, 3.75 g of NaOH (93.5 m mole) are used. A product is obtained which is completely insoluble in water and which has similar solubility properties to the products of Examples 1 to 3 and 7.

EXAMPLE 9

Example 4 is repeated except that the reaction time is reduced to 10 minutes. A HEC carbonate is obtained which dissolves partially in water and has a viscosity of 1,450 cp.

EXAMPLE 10

Example 4 is repeated except that the reaction time is prolonged to 20 minutes. A partially water soluble product is produced which has a viscosity of 580 cp.

EXAMPLE 11

The procedure is as in Example 4 except that the reaction time is prolonged to 40 minutes. A partially water soluble product is obtained which has a viscosity of 2,400 cp.

Examples 4 and 9 to 11 show that, to maximize the water insolubility of the HEC carbonate, the preferred reaction time is approximately 20 minutes.

EXAMPLE 12

The procedure is as in Example 1 except that 20 g of chloroformic acid ethyl ester (0.184 mole) are used as the modifying agent and, correspondingly, 7.4 g NaOH (0.184 mole) are used to take up the HCl product by the modification reaction. A product is obtained which is sparingly soluble in water and which settles out therein and which, like the products of Examples 1 to 11, goes irreversibly and quantitatively into solution when alkali is added (2N).

A 0.5% by weight dispersion of the modified product is filtered in a glass suction filter with weak suction action and an aliquot of the greatly swollen product is subjected to a dry determination test. From the weight loss it is determined that the insoluble portions of the HEC carbonate absorb an amount of water approximately 10 times their own weight.

EXAMPLE 13

The procedure is as in Example 1 except that there are used as the modifying reagent 20 g of chloroformic acid benzyl ester (0.126 mole) and, correspondingly, 5 g of NaOH (0.125 mole). A product is obtained which is partially soluble in water; it has a viscosity of 1,200 cp.

EXAMPLE 14

In a pressure vessel, 350 g of cellulose are suspended in 3 l of isopropanol (87% by weight) with the addition of 430 g of aqueous 25% by weight sodium hydroxide solution and the suspension is mixed thoroughly for 30 minutes at 20° C. 230 g of ethylene oxide are then added and, while continuing to stir, the suspension is maintained for one hour at 70° C. At this point it contains approximately 500 g of hydroxyethylcellulose. After cooling, the alkali content is reduced to such an extent that 21.2 g (0.53 mole) NaOH are still present. 50 g of chloroformic acid methyl ester (0.53 mole), dissolved in 50 ml of isopropanol, are slowly added dropwise to this mixture. After a reaction time of 15 minutes, glacial acetic acid is used to neutralize against phenolphthalein as indicator, filtering is effected by means of a glass suction filter and washing is carried out with aqueous isopropanol. The product is taken up in 15 l of water, neutralized again with conc. HCl, filtered and then twice freed of water by means of acetone, dried, ground, and sieved (0.5 mm). A fine, freeflowing, salt-free powder is obtained which can swell only slightly in water, is soluble in dilute NaOH but insoluble in dilute HCl.

EXAMPLE 15

100 g of methyl-hydroxyethyl-cellulose (0.4 mole) with a 29.5% by weight methoxyl content and a viscosity of approximately 4,000 cp are suspended in a mixture of 1.115 ml isopropanol and 126 ml of water that contains 8.5 g of NaOH (0.21 mole) and the whole is stirred for 30 minutes at room temperature. A solution of 20 g of chloroformic acid methyl ester (0.21 mole) in 40 ml of isopropanol is then added dropwise and stirring is continued for 15 minutes. Filtering is effected by means of a glass suction filter, the product is washed twice with aqueous (50% by weight) isopropanol, freed from isopropanol and water by rinsing with acetone and dried at 60° C. The resulting methyl-hydroxyethyl-cellulose carbonate is partially soluble in water and has a viscosity of approximately 1,100 cp. It has a solubility characteristic analogous to that of hydroxyethyl-cellulose carbonates.

What is claimed is:

1. A process for the modification of a cellulose ether containing hydroxyalkyl groups, which comprises the step of reacting said ether with a chloroformic acid ester in an aqueous organic medium containing an alkali metal hydroxide, whereby the cellulose ether is rendered at least partially insoluble in water.

2. The process as claimed in claim 1, wherein the reaction medium contains at most about 40% by weight of water.

3. The process as claimed in claim 1, wherein the reaction medium contains at least about 10 % by weight of water.

4. The process as claimed in claim 1, wherein the molar ratio of alkali hydroxide to chloroformic acid ester is from about 1:0.9 to 1:1.1.

5. The process as claimed in claim 4, which is carried out at from about 20° C to 40° C.

6. The process as claimed in claim 1, wherein the chloroformic acid ester is present in proportion of at least 0.025 mole per mole of cellulose ether.

7. The process as claimed in claim 6, wherein the ester is present in a proportion of between 0.1 to 0.6 mole per mole of cellulose ether.

8. The process as claimed in claim 1, wherein a chloroformic acid ester of a monohydric alcohol having from 1 to about 8 carbon atoms is used.

9. The process as claimed in claim 8, wherein methyl chloroformate is used.

10. The process as claimed in claim 1, wherein the cellulose ether additionally contains methyl ether groups.

11. The process as claimed in claim 1, wherein the organic solvent ingredient of the reaction medium is isopropanol or tert.-butanol.

12. A process for dissolving the modified cellulose ether as produced by the process as claimed in claim 1 which comprises the steps of introducing the ether into water and subsequently raising the pH of the water to a value of at least about 11.

* * * * *